United States Patent [19]

Biancale

[11] 4,281,872
[45] Aug. 4, 1981

[54] TARPAULIN COVER SYSTEM FOR USE WITH A TRUCK BOX

[76] Inventor: Vito Biancale, R.R.#2, Dundas, Ontario, Canada

[21] Appl. No.: 6,762

[22] Filed: Jan. 26, 1979

[30] Foreign Application Priority Data

Jun. 28, 1978 [CA] Canada .................................. 306406

[51] Int. Cl.³ .............................................. B60P 7/04
[52] U.S. Cl. ................................................... 296/100
[58] Field of Search .................... 296/100, 101, 137 G

[56] References Cited

U.S. PATENT DOCUMENTS

| 3,041,104 | 6/1962 | Richard | 296/100 |
|---|---|---|---|
| 3,179,464 | 4/1965 | McBurney et al. | 296/100 |
| 3,521,927 | 7/1970 | Barry | 296/100 |
| 3,942,830 | 3/1976 | Woodard | 296/100 X |
| 3,975,047 | 8/1976 | McClellan | 296/100 |
| 4,189,178 | 2/1980 | Cramaro | 296/100 X |
| 4,210,361 | 7/1980 | Marvin | 296/100 X |

FOREIGN PATENT DOCUMENTS 285534  2/1928  United Kingdom ................ 296/137 G Primary Examiner—John L. Love
Assistant Examiner—Norman L. Stack
Attorney, Agent, or Firm—Stevens, Davis, Miller & Mosher

[57] ABSTRACT

A cover system according to one aspect of the invention includes a tarpaulin and a series of support rods attached to a longitudinal medial section thereof in spaced parallel relation and arranged to extend transversely of the truck box in the installed condition. A cable system is provided adapted to be installed such that each one of a pair of horizontal reaches of the cable extend along parallel to and above respective ones of the upper edges of the box. The support rods are adapted to be connected at their opposing ends to the respective horizontal reaches of the cable. These rods, save for a final or terminal one of the rods, are arranged to be connected to said reaches of the cable for relative movement therealong. The final rod is adapted to be connected to the tarpaulin and to said reaches of the cable so that movement of the latter can carry the tarpaulin along the upper edges of the box in either direction. The above-noted tarpaulin also includes longitudinal marginal sections flanking the medial section and adapted to extend downwardly alongside the side walls of the box. Tensioning wire means are adapted to extend alongside the side walls of the box and means are provided for connecting the marginal sections of the tarpaulin to respective ones of the tensioning wires at spaced apart intervals for movement therealong when the tarpaulin is moved along the upper edges of the box.

14 Claims, 11 Drawing Figures

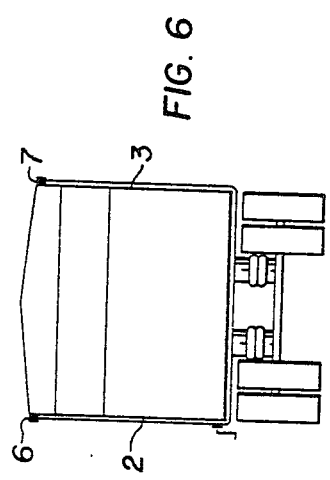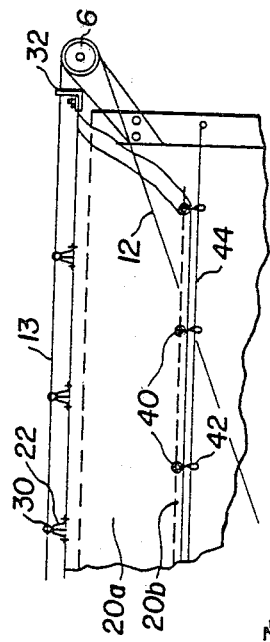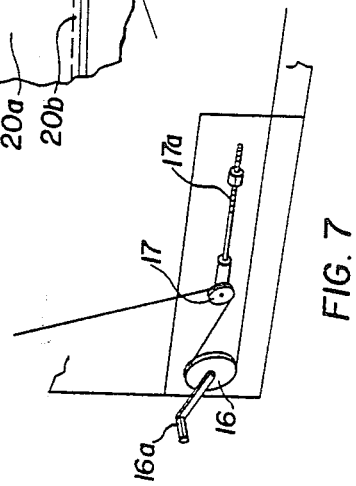

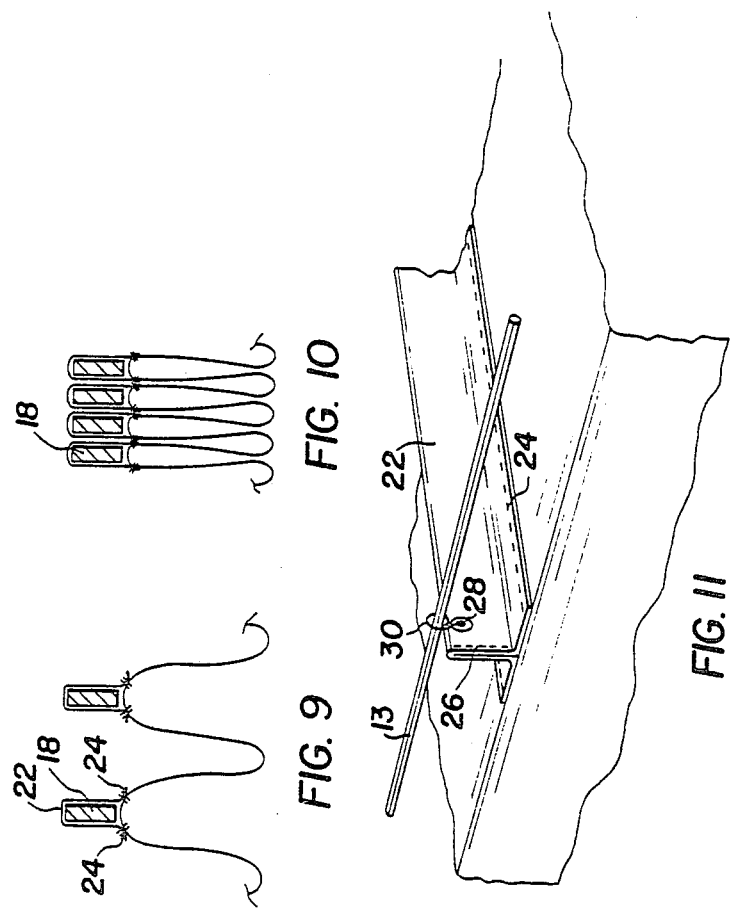

TARPAULIN COVER SYSTEM FOR USE WITH A TRUCK BOX

This invention relates to a tarpaulin cover system for use with a truck box of the type including a floor, a front wall, and a pair of upright side walls.

Truck boxes of the type noted above are commonly used for the hauling of sand, gravel, and other forms of materials.

Tarpaulin covers of the type under consideration are useful for many reasons. They help to prevent escape of the contents of the truck box onto public roadways etc., during transit and they reduce the danger to motorists following such dump truck. The tarpaulin cover may be made waterproof in which event the contents of the truck box are at last partially protected from the elements.

In order for a tarpaulin system to be truly effective, it should be relatively easy to install on existing truck boxes without the need for effecting substantial modifications. The tarpaulin system should be simple and inexpensive to manufacture. It should be reliable in use and should possess a relatively long life. It should not be subject to damage even when used in connection with the transport of coarse heavy materials such as rocks or the like even when such materials are loaded into the truck box by means of side loading machines.

It is a broad objective of the present invention to provide a tarpaulin cover system which satisfies all of the above objectives and which possesses a number of advantages over and above comparable prior art devices.

A cover system according to one aspect of the invention includes a tarpaulin and a series of support rods attached to a longitudinal medial section thereof in spaced parallel relation and arranged to extend transversely of the truck box in the installed condition. A cable system is provided adapted to be installed such that each one of a pair of horizontal reaches of the cable extend along parallel to and above respective ones of the upper edges of the box. The support rods are adapted to be connected at their opposing ends to the respective horizontal reaches of the cable. These rods, save for a final or terminal one of the rods, are arranged to be connected to said reaches of the cable for relative movement therealong. The final rod is adapted to be connected to the tarpaulin and to said reaches of the cable so that movement of the latter can carry the tarpaulin along the upper edges of the box in either direction. The above-noted tarpaulin also includes longitudinal marginal sections flanking the medial section and adapted to extend downwardly alongside the side walls of the box. Tensioning wire means are adapted to extend alongside the side walls of the box and means are provided for connecting the marginal sections of the tarpaulin to respective ones of the tensioning wires at spaced apart intervals for movement therealong when the tarpaulin is moved along the upper edges of the box.

Preferably, the support rods, save for the final rod, are attached to the upper face of the tarpaulin via respective elongated strips of fabric, each of which overlies its associated rod and are stitched along the opposing sides of the rod to the tarpaulin thus forming an elongated pocket which retains the rod.

Preferably each rod has an elongated rectangular cross-section, the long dimension of such section being vertically disposed in the installed condition of the tarpaulin.

Preferably, the means for connecting said marginal edge portions to the tensioning wires are staggered in the longitudinal direction with respect to the longitudinal locations of the support rods on the tarpaulin.

In accordance with a further aspect of the invention there is provided an elongated tarpaulin cover for use with a truck box of the type referred to above which tarpaulin includes a longitudinal medial section and a pair of longitudinal marginal sections in flanking relation to the medial section. The longitudinal medial section has a series of spaced parallel transversely extending pockets thereon. Each pocket is adapted to receive an associated tarpaulin support rod. The marginal sections each define a respective longitudinal edge, each such edge having a series of means spaced therealong for connecting such edges to respective tarpaulin tensioning wires. Preferably, said last-mentioned means occupy positions which are offset in the longitudinal direction from the positions occupied by said pockets longitudinally of the tarpaulin.

In a further aspect of the invention there is provided a tarpaulin cover system of the character described above in combination with a truck box of the type including a floor, a front wall, and a pair of upright side walls each defining a generally horizontal upper edge.

Further features of the invention and the advantages associated therewith will become more evident from the following description of a preferred embodiment of the invention with reference being made to the drawings wherein:

FIG. 6 is an end view showing the rear of the truck box of FIG. 1;

FIG. 7 is a perspective view showing a portion of a winch for operating the cable;

FIG. 8 is a side elevation of the upper rear portion of the truck box showing certain pulleys and certain tarpaulin to wire rope connections;

FIG. 9 is a cross-section view of the tarpaulin cover taken along IX—IX of FIG. 2;

FIG. 10 is a view similar to FIG. 9 but with the tarpaulin cover in a fully folded state;

FIG. 11 is a perspective view of a portion of the tarpaulin cover further illustrating the tarpaulin to wire rope connection.

Figure 1:
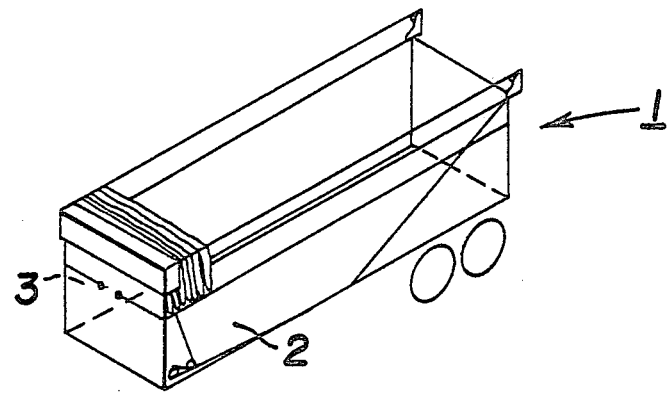
FIG. 1 is a schematic, perspective view showing a truck box with the tarpaulin cover according to the present invention in a fully folded state.

The drawings show a generally rectangular truck box 1 having a left side wall 2 and a right side wall 3 and a front wall 3a. Near the upper edge of the front wall 3a of the truck are disposed two coaxial pulleys 4, 5, the pulley 4 being at the left side wall 2 and pulley 5 at the right hand side wall 3. Another pair of pulleys 6, 7 is disposed near the upper edge of the respective side walls 2, 3, at the rear ends thereof, each being mounted on brackets and projecting rearwardly as seen in FIG. 8. Two pairs of further pulleys 8–9 and 10–11 are disposed near the respective side walls 2, 3 at the bottom of the truck box 1 as seen in FIGS. 4 and 5, the axes of pulleys 9–11 being inclined such as to maintain the grooves of the respective pulleys 9, 10, 11 in line with a portion of the periphery of the respective adjacent pulleys 6, 5 and 7.

Figure 2:
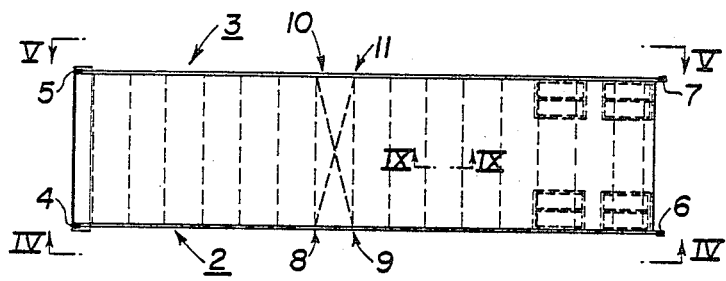
FIG. 2 is a plan view of the tarpaulin cover and truck box arrangement as shown in FIG. 1, with the tarpaulin cover shown in a fully extended state.

The system to pulleys 4–11 is arranged to guide an integral steel cable 12 disposed as follows. Beginnning at pulley 4 as viewed in FIG. 4 and proceeding to the right of FIG. 5, the cable 12 has, first, a straight, horizontal reach 13 extending between pulleys 4 and 6. Following pulley 6, the cable 12 is deflected down to pulley 9 to continue, around pulley 9 and across the box 1 (see FIG. 2), to the pulley 10, over a stretch extending slightly below the bottom of box 1. From pulley 10, the cable 12 extends upwardly and forwardly (see FIG. 5), towards pulley 5, to further extend in a second straight, horizontal reach 14 extending towards pulley 7, then downwardly and forwardly towards pulley 11, across the truck box 1, around pulley 8 and thence forwardly to winch system 15 and thence onwardly around to pulley 4.

Figure 4:
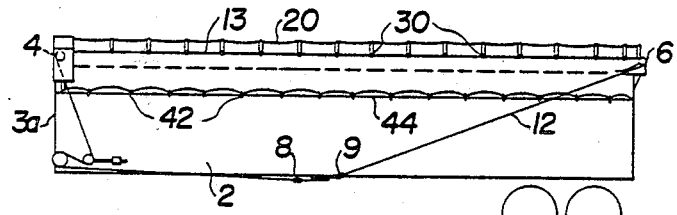
FIG. 4 is a side view IV—IV of FIG. 2.

As best shown in FIG. 4, the winch assembly 15 is arranged on side wall 2 adjacent the front of the box 1, the assembly being also shown in FIG. 7. The assembly comprises a single groove pulley 16 of a generally known configuration capable of engaging cable 12 without slippage when pulley 16 is rotated by crank handle 16a. The assembly further includes an idler pulley 17 and is movable via tension adjusting screw 17a in a direction radially toward or away from pulley 16. As seen in FIG. 4 the stretch of cable 12 from pulley 8 is trained around the groove of pulley 16 such as to become deflected towards idler pulley 17, then about the idler pulley 17 and thence upwardly and forwardly towards the pulley 4 near the top frontal part of the truck box 1.

Figure 5:
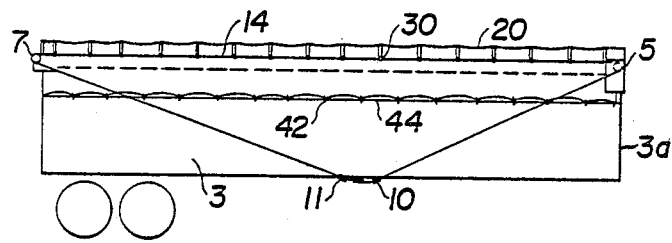
FIG. 5 is a side view V—V of FIG. 2.

Referring to FIGS. 4 and 5, it will be appreciated that both upper horizontal reaches 13, 14 of the wire cable 12 are disposed such as to be slightly above and generally parallel to the respective top edges of the adjacent side walls 2 and 3 of truck box 1. Both horizontal reaches 13, 14 of the cable are arranged to carry a plurality of laterally disposed rods 18 which, in turn, are connected to and serve to carry the tarpaulin 20. Tarpaulin 20 is made of any conventional material, such as heavy canvas.

The rods 18 are, in the extended condition of tarpaulin 20, disposed in spaced parallel relation and extend transversely of the truck box 1. Rods 18 have a length about equal to the width of the box. The rods 18 are connected to a longitudinal medial section of tarpaulin 20 in the fashion shown in FIGS. 9 and 10. Each rod 18 is provided with an overlying strip of fabric 22 which is stitched along both of the opposing sides of rod 18 at lines 24 thereby to form an elongated pocket within which the respective rod 18 is located. When the tarpaulin is retracted, the rods 18 come into close juxtaposition as shown in FIG. 10 with folds of the tarpaulin 20 hanging downwardly therefrom. The outermost end of each of fabric strips 22 is sewn together along line 26 as seen in FIG. 11 and a grommet 28 is located therein. A carrier ring 30 extending through each grommet serves to connect the opposing ends of each elongated pocket and its enclosed rod 18 to the respective horizontal reaches 13, 14 of the cable system. The system of support rods 18 also includes a final tarpaulin supporting rod 32 to which respective portions of the horizontal stretches 13, 14 are fixedly secured. Accordingly, when the horizontal runs 13, 14 are moved in either direction, the final tarpaulin supporting rod 32 is carried along with the cable. The rods 18 are preferably of the type having rectangular, upwardly elongated cross-section of the size of approximately 2 inches by 174 of an inch thus providing substantial rigidity in the vertical direction. The final rod 32 may be a 2 inches by 2 inches angle. It is attached to the extreme travelling end of the tarpaulin by holding screws and battens (not shown) or by any other suitable means. The front end of the tarpaulin is likewise fixed to the front end of the box by any suitable means. Rods 18 may be slightly "crowned" i.e. of shallow inverted V-shape configuration to provide the top with a slight ridge as seen in FIG. 6.

The marginal sections 20a of the tarpaulin 20 extend downwardly for a short distance alongside the respective side walls 2, 3 of the truck box. The extreme marginal edges 20b of such sections are provided with spaced grommets 40, each of which is provided with a traveller ring 42. A tensioning cable 44 extends along each side of the truck box a distance below the upper edge thereof. The several traveller rings 42 slidably engage an associated one of these tensioning cables 44. It will be seen from FIGS. 4, 5 and 8 that the several traveller rings 42 are in longitudinally offset relation or in staggered relation to the locations of the support rods 18 and carrier rings 30. This is of importance in providing for neat folding of the tarpaulin 20 when the same is being moved to the collapsed condition adjacent the front of the truck box.

Figure 3:
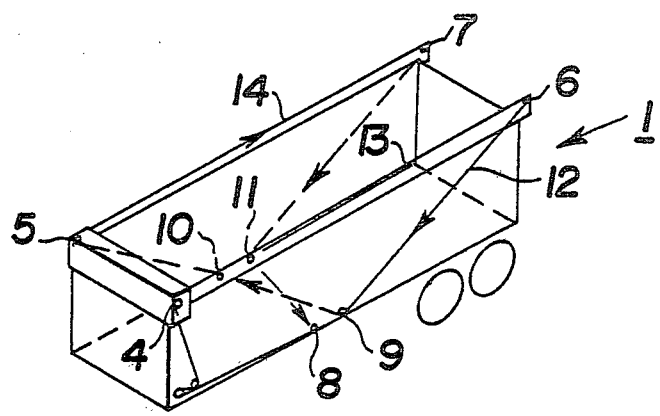
FIG. 3 is a schematic perspective view similar to that of FIG. 1, showing the diagram of the cable system for operating the tarpaulin cover with certain parts omitted.

In operation, and assuming that it is desired to close the folded tarpaulin 20 as shown in FIG. 1, the winch assembly 15 is operated to move the cable 12 in the direction as indicated in FIG. 3. In other words, the crank 16a of the winch 15, as viewed in FIG. 4 is turned clockwise. This results in the rearward movement of both horizontal reaches 13, 14 of the cable system to move the rear or final tarpaulin supporting rod 32 backwards with the resulting gradual stretching of the folds of the tarpaulin 20 between adjacent rods 18. The remaining rods 18 simply slide relative to the reaches 13, 14 of cable as the respective portions of the tarpaulin become stretched, with the traveller rings 42 sliding along tensioning cables 44 until the truck box is completely covered.

One advantage of the system is in the use of the tarpaulin supporting rods 18 of an upwardly elongated rectangular cross-section which not only are resistant to impacts from the top during loading of the box but, even more important, are so connected to the tarpaulin as to form a generally solid surface on full folding of the tarpaulin as shown in FIG. 10. Accordingly, in such folded state, the rods 18 are brought into close juxtaposition with each other to form a generally solid platform protecting the tarpaulin from becoming damaged by the material that is being loaded into the truck box 1. Further, by staggering the carrier rings 30 relative to the traveller rings 42, relatively neat and compact folding of the tarpaulin is facilitated.

Due to the virtual impossibility of transverse misalignment between the horizontal reaches 13, 14 of cable (as there is virtually no possibility of slippage between the two reaches), the tarpaulin cover 20 can be safely used even in cases wherein bulk material loaded into the box (for instance sand or the like) extends above the top edges of the side walls of the box. In such case, the final tarp support rod 32 simply sweeps the top of the bulk of the material away, to make a way for the passage of the tarpaulin. The resistance to the movement of rod 32 while engaged with the bulk material can not result in misalignment of rod 32, as the overall rope system is an integral unit.

The above-noted tensioning cables 44 and the traveller rings 42 maintain the longitudinal marginal sections 20a of the tarpaulin 20 in a relatively taut condition generally parallel to the sides of the box 1 in the extended condition of the tarpaulin thus eliminating flapping of same and the resulting wear and tear during transit. At the same time, since the reaches 13, 14 of cable are well above the upper edges of the side walls of the box and since such reaches of cable serve to support the laterally extending tarpaulin support rods 18, the tarpaulin is held virtually clear of the upper edges of the side walls of the box when the tarpaulin is in the fully extended, taut, condition thus further reducing wear and tear on same.

I claim:

1. A tarpaulin cover system for use with a truck box of the type including a floor, a front wall and a pair of upright side walls each defining a generally horizontal upper edge, the cover system including a tarpaulin, and a series of support rods attached to a longitudinal medial section thereof in spaced parallel relation and arranged to extend transversely of the box in the installed condition, and a cable system adapted to be installed such that each one of a pair of horizontal reaches of the cable extends along parallel to and above a respective one of the upper edges of the box, the support rods adapted to be connected at their opposing ends to the respective horizontal reaches of the cable for support thereby, said rods save for a final one of the rods, adapted to be connected to said reaches of the cable for relative movement therealong, the final rod adapted to be connected to the tarpaulin and being fixed to said reaches of the cable so that movement of said reaches of cable can move the tarpaulin along the upper edges of the box, said tarpaulin having longitudinal marginal sections flanking the medial section and adapted to extend downwardly alongside the side walls of the box, a pair of tensioning wires each adapted to extend alongside an associated one of the side walls of the box, and means for connecting said marginal sections of the tarpaulin to respective ones of the tensioning wires at spaced apart intervals for movement therealong when the tarpaulin is moved along the upper edges of the box, and wherein the means for connecting said marginal edge portions to the tensioning wires are longitudinally staggered with respect to the longitudinal locations of the support rods on the tarpaulin.

2. The cover system according to claim 1 wherein said support rods, save for the final rod, are attached to the upper face of the tarpaulin via respective elongated strips of fabric each of which overlies its associated rod and is stitched along the opposing sides of the rod to the tarpaulin thus forming an elongated pocket which retains the rod.

3. The cover system according to claim 2 wherein each rod has an elongated rectangular cross-section the long dimension of such section being vertically disposed in the installed condition of the tarpaulin.

4. A tarpaulin cover system in combination with a truck box of the type including a floor, a front wall and a pair of upright side walls each defining a generally horizontal upper edge, the cover system including a tarpaulin, and a series of support rods attached to a longitudinal medial section thereof in spaced parallel relation and extending transversely of the box, and a cable system arranged such that each one of a pair of horizontal reaches of the cable extends parallel to and above a respective one of the upper edges of the box, the support rods being connected at their opposing ends to the respective horizontal reaches of the cable for support thereby, said rods, save for a final one of the rods, being connected to said reaches of the cable for relative movement therealong, the final rod being connected to the tarpaulin and being fixed to said reaches of the cable so that movement of said reaches of cable moves the tarpaulin along the upper edges of the box, said tarpaulin having longitudinal marginal sections flanking the medial section and which extend downwardly alongside the side walls of the box, a pair of tensioning wires, each extending alongside a respective one of the side walls of the box, and means connecting said marginal sections to respective ones of the tensioning wires at spaced apart intervals for movement therealong as the tarpaulin is moved along the upper edges of the box wherein the means for connecting said marginal sections of the tarpaulin to the tensioning wires are longitudinally staggered with respect to the locations of the support rods on the tarpaulin.

5. The combination according to claim 4 wherein said support rods, same for the final rod, are attached to the upper face of the medial section of the tarpaulin via respective elongated strips of fabric each of which overlies its associated rod and is stitched along the opposing sides of the rod to the tarpaulin thus forming an elongated pocket which retains the rod.

6. The combination according to claim 5 wherein each rod has an elongated rectangular cross-section, the long dimension of such section being vertically disposed.

7. An elongated tarpaulin cover for use with a truck box of the type including a front wall and a pair of upright side walls, said tarpaulin including a longitudinal medial section and a pair of longitudinal marginal sections in flanking relation to the medial section, said longitudinal medial section having a series of spaced parallel transversely extending pockets thereon, each adapted to receive an associated tarpaulin support rod, means associated with the opposing ends of each said pocket to allow the support rods to be connected, in use, to cables extending along the tops of the side walls of the truck box, said marginal sections each defining a respective longitudinal edge, each such edge having a series of further means spaced therealong for connecting such edges to respective tarpaulin tensioning wires, and wherein said further means for connecting the longitudinal edges of the tarpaulin to the tarpaulin tensioning wires are longitudinally staggered with respect to the longitudinal locations of said pockets which, in use, receive therein the associated tarpaulin support rods.

8. A tarpaulin cover system for use with a truck box of the type including a floor, a front wall and a pair of upright side walls each defining a generally horizontal upper edge, the cover system including a tarpaulin, and a series of support rods attached to a longitudinal section thereof in spaced parallel relation and arranged to extend transversely of the box in the installed condition, and a cable system installed such that each one of a pair of horizontal reaches of the cable is supported by pulleys at each end of said truck box and extends along parallel to and above a respective one of the upper edges of the box, the support rods connected at their opposing ends to the respective horizontal reaches of the cable for support by the latter, said rods save for a final one of the rods, connected to said reaches of the cable for relative movement and support therealong, the final rod connected to the tarpaulin and to said reaches of the cable so that movement of said reaches of cable can move the tarpaulin along the upper edges of the box, wherein the cable system forms a closed or endless loop with the cable having a path of travel defined by a series of elongated runs; and a plurality of pulleys attached to the truck box to support said runs and arranged with a pair of said runs crossing over each other from one side of the box to the other with each of said pair of runs interconnecting a frontal end of a respective one of the horizontal reaches to a rear end of the other horizontal reach so that movement of the cable along its path causes each of said pair of horizontal reaches to move in the same direction relative to said upper edges of the box wherey to effect the movement of the tarpaulin therealong, and a winch arrangement including a drive pulley adapted to be disposed in a bight of said cable for moving the latter along its path of travel.

9. The system according to claim 8 wherein said winch is adapted to be located in a position remote from the region where said pair of runs cross over one another.

10. The system according to claim 9 wherein said pair of runs cross over each other beneath the bottom of the box and wherein said winch is adapted to be located on one of the sides of the box.

11. A tarpaulin cover system in combination with a truck box of the type including a floor, a front wall and a pair of upright side walls each defining a generally horizontal upper edge, the cover system including a tarpaulin, and a series of support rods attached to a longitudinal section thereof in spaced parallel relation and extending transversely of the box, and a cable system arranged such that each one of a pair of horizontal reaches of the cable is supported by pulleys at each end of the truck box and extends parallel to and above a respective one of the upper edges of the box from adjacent the front wall to adjacent the rear of the box, the support rods being connected at their opposing ends to the respective horizontal reaches of the cable for support by the latter, said rods, save for a final one of the rods, being connected to said reaches of the cable for relative movement and support therealong, the final rod being connected to the tarpaulin and to said reaches of the cable so that movement of said reaches of cable moves the tarpaulin along the upper edges of the box, and wherein the cable system forms a closed or endless loop with the cable having a path of travel defined by a series of elongated runs, and a plurality of pulleys attached to the truck box to support said runs, with a pair of said runs crossing over each other from one side of the box to the other with each of said pair of runs interconnecting a frontal end of a respective one of the horizontal reaches to a rear end of the other horizontal reach so that movement of the cable along its path causes each of said pair of horizontal reaches to move in the same direction relative to said upper edges of the box whereby to effect the movement of the tarpaulin therealong, and a winch arrangement includng a drive pulley disposed in a bight of said cable for moving the latter along its path of travel.

12. The combination according to claim 11 wherein said winch is located in a position remote from the region where said pair of runs cross over one another.

13. The combination according to claim 12 wherein said pair of runs cross over each other beneath the bottom of the box and wherein said winch is located on one of the sides of the box.

14. The combination according to any one of claims 11, 12 or 13 further including means for tensioning the cable thereby to maintain said horizontal reaches of cable relatively taut.

* * * * *